US005924675A

United States Patent [19]

Hussey et al.

[11] Patent Number: 5,924,675

[45] Date of Patent: Jul. 20, 1999

[54] AUTOMOTIVE EMISSION CONTROL VALVE HAVING TWO-PART SOLENOID POLE PIECE

[75] Inventors: Scott E. W. Hussey; Allan Tamman; Murray F. Busato, all of Chatham, Canada

[73] Assignee: Siemens Canada Limited, Mississauga, Canada

[21] Appl. No.: 08/923,395

[22] Filed: Sep. 3, 1997

[51] Int. Cl.$^{6}$ .............................. F16K 31/02; H01F 3/00

[52] U.S. Cl. ...................................... 251/129.15; 335/281

[58] Field of Search ................. 123/568.26; 251/129.18, 251/129.15; 335/219, 258, 260, 261, 278, 279, 281; 29/606

[56] References Cited

U.S. PATENT DOCUMENTS

| | | | |
|---|---|---|---|
| 2,780,433 | 2/1957 | Fleming | 251/70 |
| 2,980,139 | 4/1961 | Lynn | 137/625.5 |
| 3,538,954 | 11/1970 | Fagerlie et al. | 137/625.5 |
| 3,678,909 | 7/1972 | Barker et al. | 123/119 A |
| 3,756,558 | 9/1973 | Okui | 251/282 |
| 3,941,105 | 3/1976 | Yagi et al. | 123/119 A |
| 3,949,964 | 4/1976 | Freeman | 251/76 |
| 4,119,294 | 10/1978 | Schnorrenberg | 251/129 |
| 4,364,408 | 12/1982 | Griswold et al. | 137/107 |
| 4,662,604 | 5/1987 | Cook | 251/129.07 |
| 4,694,812 | 9/1987 | Wendt | 123/571 |
| 4,702,212 | 10/1987 | Best et al. | 123/472 |
| 4,961,413 | 10/1990 | Grey et al. | 123/571 |
| 5,027,781 | 7/1991 | Lewis | 123/568 |
| 5,094,218 | 3/1992 | Everingham et al. | 123/571 |
| 5,188,073 | 2/1993 | Ejiri et al. | 123/339 |
| 5,435,519 | 7/1995 | Everingham | 123/568.26 |
| 5,460,146 | 10/1995 | Frankenberg | 123/571 |
| 5,467,962 | 11/1995 | Bircann et al. | 251/129 |
| 5,494,255 | 2/1996 | Pearson et al. | 251/129.15 |
| 5,701,874 | 12/1997 | Sari et al. | 123/568.26 |

FOREIGN PATENT DOCUMENTS

| | | |
|---|---|---|
| 0 701 054 | 8/1995 | European Pat. Off. . |
| 0 740 064 | 12/1995 | European Pat. Off. . |
| 295 06 928 | 4/1995 | Germany . |

*Primary Examiner*—Andrew M. Dolinar
*Assistant Examiner*—Arnold Castro

[57] ABSTRACT

An automotive emission control valve including a body having an internal main flow passage between a first port and a second port, a valve seat circumscribing a transverse cross-sectional area of the passage, a valve member with a stem and a head that seats on and unseats from the valve seat, an actuator that operates the valve member. The actuator provides a magnetic circuit path that includes respective pole pieces at respective opposite axial ends of the actuator. At least one of the pole pieces being a two-part pole piece including a central hub part joined to an outer rim part that is disposed circumferentially about the central hub part.

41 Claims, 3 Drawing Sheets

AUTOMOTIVE EMISSION CONTROL VALVE HAVING TWO-PART SOLENOID POLE PIECE

FIELD OF THE INVENTION

This invention relates generally to automotive emission control valves. A more specific aspect relates to exhaust gas recirculation (EGR) valves for internal combustion engines of automotive vehicles.

BACKGROUND OF THE INVENTION

Controlled engine exhaust gas recirculation is a commonly used technique for reducing oxides of nitrogen in products of combustion that are exhausted from an internal combustion engine to atmosphere. A known EGR system comprises an EGR valve that is controlled by a circuit in accordance with various engine operating conditions to regulate the amount of engine exhaust gas that is recirculated to the induction fuel-air flow entering the engine for combustion so as to limit the combustion temperature and hence reduce the formation of oxides of nitrogen.

When EGR valves are engine-mounted, EGR valves are subject to a harsh operating environment that includes wide temperature extremes and vibrations. Exhaust emission requirements impose more stringent demands for improved control of such valves. Use of an electric actuator is one means for obtaining improved control, but in order to commercially successful, such an actuator must be able to operate properly in such extreme environments for an extended period of usage. Moreover, in mass-production automotive vehicle applications, component cost-effectiveness and size may be significant considerations. An EGR valve that possesses more accurate and quicker response can be advantageous by providing improved control of tailpipe emissions, improved driveability, and/or improved fuel economy for a vehicle having an internal combustion engine that is equipped with an EGR system. A valve that is more compact in size can be advantageous because of limitations on available space in a vehicle engine compartment.

SUMMARY OF THE INVENTION

In accomplishment of one or more of the foregoing objectives, one aspect of the present invention relates to an automotive emission control valve comprising a body having an internal main flow passage between a first port and a second port, a valve seat circumscribing a transverse cross-sectional area of the passage, a valve member with a stem and a head that seats on and unseats from the valve seat, an actuator that operates the valve member, the actuator providing a magnetic circuit path that comprises respective pole pieces at respective opposite axial ends of the actuator, at least one of the pole pieces being a two-part pole piece including a central hub part joined to an outer rim part that is disposed circumferentially about the central hub part.

In accomplishment of one or more of the foregoing objectives, another aspect of the invention relates to a pole piece for a magnetic circuit path of an electromagnetic actuator of an automotive emission control valve comprising a central hub part and an outer rim part that is disposed circumferentially about and joined to the central hub part.

In accomplishment of one or more of the foregoing objectives, another aspect of the invention relates to a method of making a pole piece of an electromagnetic actuator of an automotive emission control valve comprising: providing a metal part; providing metal strip stock; machining both a radially inner, axially extending profile and a radially outer, axially extending profile in the metal part to create a central hub; punching metal strip stock to create an outer rim part; and joining the outer rim part to the central hub part.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

DESCRIPTION OF THE PREFERRED EMBODIMENT

Figure 1:
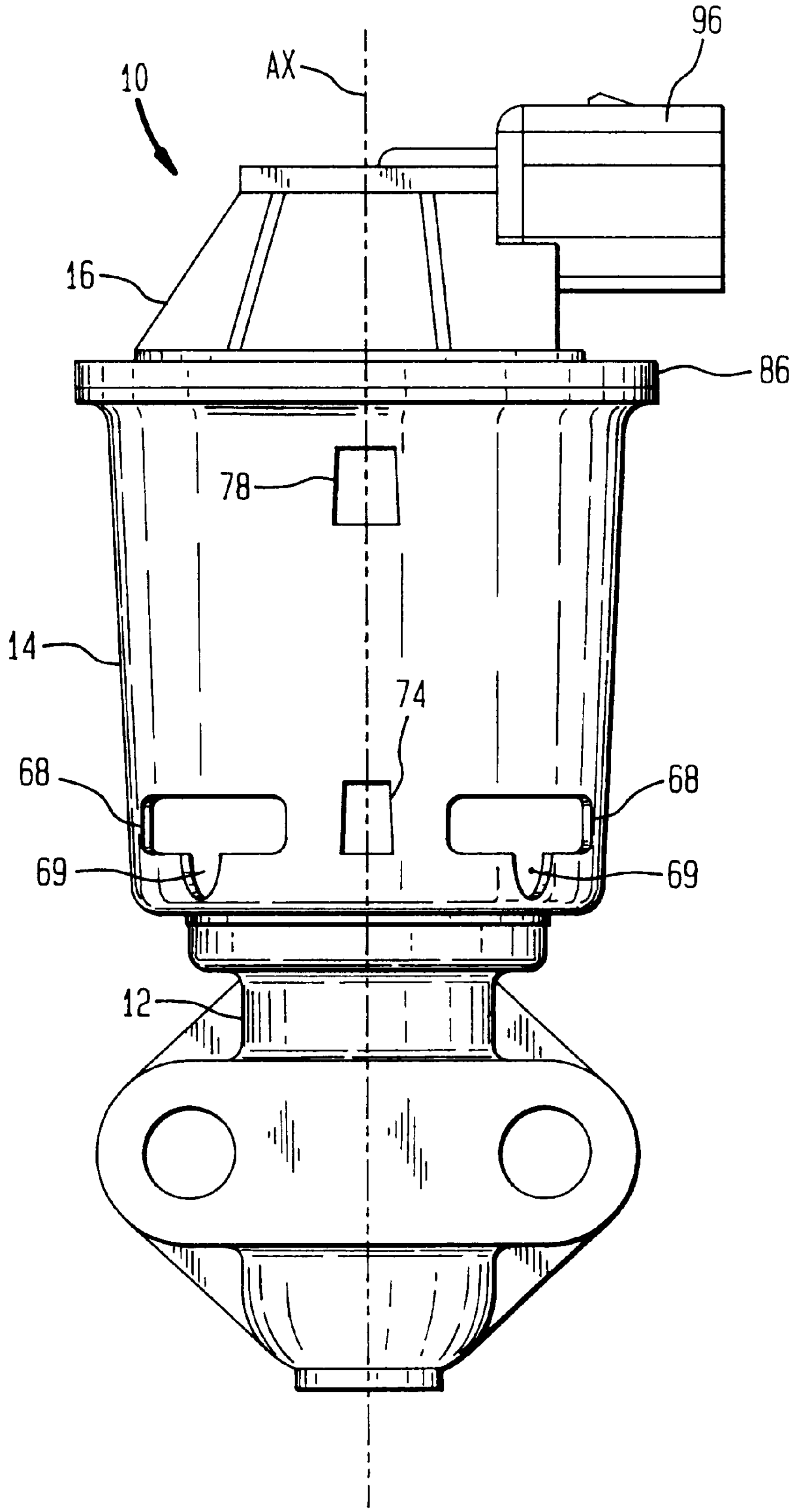
FIG. 1 is a front elevation view of an electric EGR valve (EEGR valve) embodying principles of the invention.

FIG. 1 illustrates the exterior appearance of an electric EGR valve (EEGR valve) 10 embodying principles of the present invention. EEGR valve 10 comprises valve body structure composed of a metal base 12, a generally cylindrical metal shell 14 disposed on top of base 12, and a non-metallic cap 16 forming a closure for the otherwise open top of shell 14.

Figure 2:
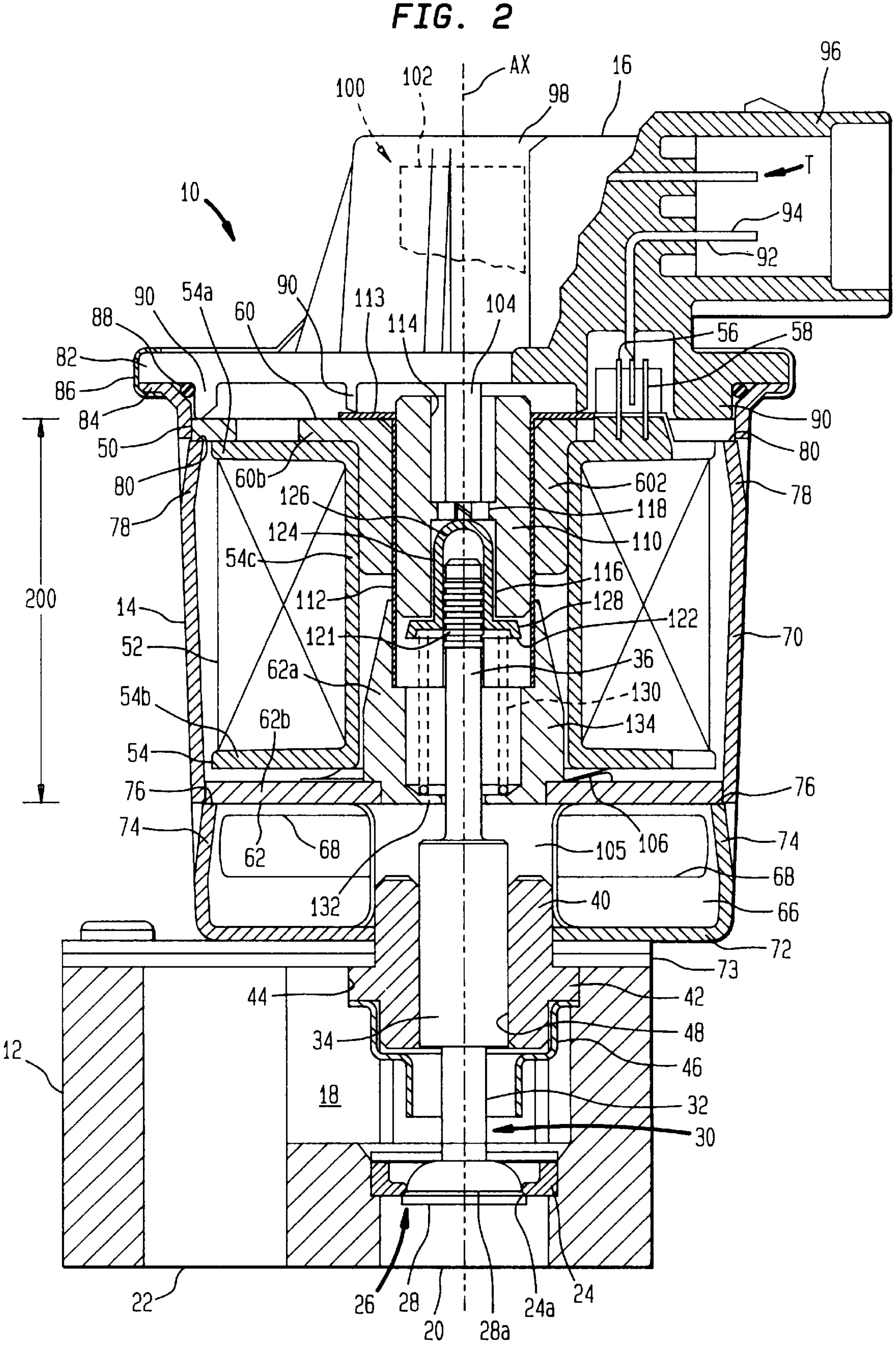
FIG. 2 is an enlarged view, mainly in cross section, of the EEGR valve of FIG. 1.
Figure 3:
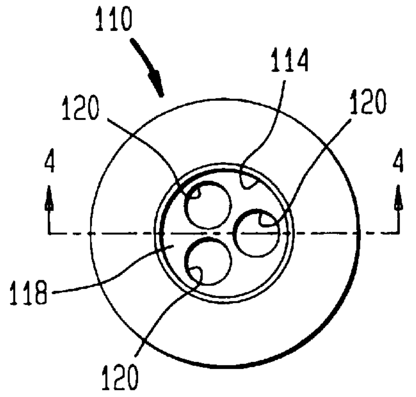
FIG. 3 is a top plan view of one of the parts of the EEGR valve shown by itself on an enlarged scale, namely an armature.
Figure 4:
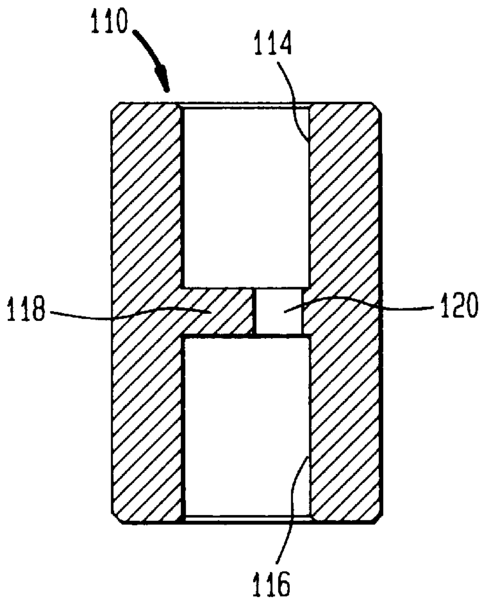
FIG. 4 is a cross-sectional view taken in the direction of arrows 4—4 in FIG. 3.

The internal construction of valve 10 is disclosed in FIGS. 2–5. FIG. 2 shows an imaginary axis AX. Base 12 comprises a main internal exhaust gas passage 18 containing an entrance, or inlet port, 20 coaxial with axis AX and an exit, or outlet port, 22 that is spaced radially from entrance 20. Both entrance 20 and exit 22 are communicated with respective passages in an engine when the valve is mounted thereon, preferably with axis AX substantially vertical, so that the entrance is communicated to engine exhaust gas and the exit to the engine induction system. Inventive aspects of the valve are suited however for different mounting arrangements.

A valve seat 24 is secured in place in passage 18 coaxial with entrance 20. Valve seat 24 has an annular shape comprising a through-hole having a frusto-conically tapered seat surface 24*a* extending around its inner margin. A one-piece, non-flow-through valve member 26 is coaxial with axis AX and comprises a non-flow-through valve head 28 and a valve stem, or valve shaft, 30 extending co-axially from head 28. Head 28 is shaped for cooperation with seat 24 by having an outer perimeter that is shaped to include a frusto-conical tapered surface 28*a* that has full circumferential contact with seat surface 24*a* when the valve is in closed position shown in FIG. 2. Stem 30 comprises a first circular cylindrical segment 32 extending from head 28, a second circular cylindrical segment 34 extending from segment 32, and a third circular cylindrical segment 36 extending from segment 34. It can be seen that segment 34 has a larger diameter than either segment 32, 36. Valve member 26 is shown as a one-piece structure formed from a homogeneous material. Thus the illustrated valve member 26 is a monolithic structure. Alternatively, valve member 26 can be fabricated from two or more individual parts assembled integrally to form a one-piece structure.

Valve 10 further comprises a bearing member 40 which is basically a circular cylindrical member except for a circular flange 42 intermediate its opposite axial ends. Base 12 comprises a counterbore 44 dimensioned to receive flange 42. Because the counterbore intersects passage 18, the counterbore lacks a full circumferential extent. At its lower end, the counterbore comprises a shoulder. An upper rim flange of a deflector member 46 is axially captured between flange 42 and the counterbore shoulder. Deflector member 46 is a metal part shaped to circumferentially bound a portion of bearing member 40 below flange 42 and a portion of stem segment 32 extending from segment 34. Deflector member 46 terminates a distance from valve head 28 so as not to restrict exhaust gas flow through passage 18, but at least to some extent deflect the gas away from stem 30 and bearing member 40.

Bearing member 40 further comprises a central circular through-hole, or through-bore, 48 with which stem segment 34 has a close sliding fit. Bearing member 40 comprises a material that possesses some degree of lubricity providing for low-friction guidance of valve member 26 along axis AX.

Shell 14 contains an electromagnetic actuator, namely a solenoid, 50 coaxial with axis AX. Actuator 50 comprises an electromagnetic coil 52 and a polymeric bobbin 54. Bobbin 54 comprises a central tubular core **54*c* and flanges 54*a*, 54*b* at opposite ends of core 54*c*. Coil 52 comprises a length of magnet wire wound around core 54*c* between flanges 54*a*, 54*b*. Respective terminations of the magnet wire are joined to respective electric terminals 56, 58 mounted on flange 54*a***.

Actuator 50 comprises stator structure associated with coil 52 to form a portion of a magnetic circuit path. The stator structure comprises an upper pole piece 60, disposed at one end of the actuator coaxial with axis AX, and a lower pole piece 62 disposed at the opposite end of the actuator coaxial with axis AX. A portion of the wall of shell 14 that extends between pole pieces 60, 62 completes the stator structure exterior of the coil and bobbin.

An annular air circulation space 66 is provided within shell 14 axially intermediate base 12 and actuator 50. This air space is open to the exterior by several air circulation apertures, or through-openings, 68 extending through shell 14. Shell 14 comprises a side wall 70 substantially co-axial with axis AX and an end wall 72 via which the shell mounts on base 12. Each hole 68 has a lower edge that is spaced from end wall 72 except for the inclusion of an integral drain 69 that is disposed centrally along the circumferential extent of each hole and that extends to end wall 72. This enables any liquid that may accumulate on end wall 72 within space 66 to drain out of the space by gravity, and in the process maintains substantial integrity between side wall 70 and end wall 72. Thermal insulation 73 is desirably disposed between end wall 72 and base 12.

Side wall 70 has a slight taper that narrows in the direction toward base 12. In the portion of the shell side wall that bounds space 66, several circumferentially spaced tabs 74 are lanced inwardly from the side wall material to provide rest surfaces 76 on which lower pole piece 62 rests. Proximate its open upper end, the shell side wall contains similar tabs 78 that provide rest surfaces 80 on which upper pole piece 60 rests. Cap 16 closes the otherwise open upper end of shell 14 and comprises an outer margin 82 that is held secure against a rim 84 at the end of the shell side wall by a clinch ring 86. A circular seal 88 is disposed between the cap and shell to make a sealed joint between them. The interior face of cap 16 comprises formations 90 that engage upper pole piece 60 to hold the latter against rests 80 thereby axially locating the upper pole piece to the shell. Cap 16 comprises a first pair of electric terminals 92, 94 that mate respectively with terminals 56, 58. Terminals 92, 94, protrude from the cap material where they are bounded by a surround 96 of the cap material to form a connector adapted for mating connection with a wiring harness connector (not shown) for connecting the actuator to an electric control circuit.

Cap 16 also comprises a tower 98 providing an internal space for a position sensor 100. Sensor 100 comprises plural electric terminals, designated generally by the reference T, that extend from a body 102 of sensor 100 to protrude into the surround 96 for connecting the sensor with a circuit. Sensor 100 further comprises a spring-biased sensor shaft, or plunger, 104 that is coaxial with axis AX.

The construction of valve 10 is such that leakage between passage 18 and air circulation space 66 is prevented. Bearing member through-hole 48 is open to passage 18, but valve stem section 34 has a sufficiently close sliding fit therein to substantially occlude the through-hole and prevent leakage between passage 18 and air circulation space 66 while providing low-friction guidance of the stem and enabling the pressure at outlet port 22 to act on the cross-sectional area of stem section 34. Within space 66, a deflector 105 circumferentially bounds the portion of the stem that passes through the space. Deflector 105 is shown to comprise a circular cylindrical thin-walled member whose opposite axial ends are flared to engage lower pole piece 62 and shell end wall 72 respectively thus forming a barrier that prevents air in the air circulation space from reaching the stem. The lower end portion of deflector 105 is shown to fit closely around the upper end portion of bearing member 40 which stops short of lower pole piece 62 so that in the absence of the deflector the stem would be directly exposed to foreign material, muddy water for example, that might enter space 66.

Upper pole piece 60 is a one-part piece that comprises a central cylindrical-walled axial hub **60*a* and a radial flange 60*b* at one end of hub 60*a*. Flange 60*b* has an opening that allows for passage of terminals 56, 58 through it. Hub 60*a* is disposed co-axially within the upper end of the through-hole in bobbin core 54*c*, with bobbin flange 54*a* disposed against flange 60*b***. This axially and radially relates the bobbin and the upper pole piece.

Lower pole piece 62 comprises a two-part construction composed of a central hub part **62*a* and a rim part 62*b* that are joined together to form a single piece. An annular wave spring 106 is disposed around hub 62*a* and between rim 62*b* and bobbin flange 54*b*, and maintains bobbin flange 54*a* against flange 60*b***. Therefore, a controlled dimensional relationship between the two pole pieces and the bobbin-mounted coil is maintained which is insensitive to external influences, such as temperature changes.

Actuator 50 further comprises an armature 110 that in cooperation with the stator structure completes the actuator's magnetic circuit path. Additional detail of the armature appears in FIGS. 3 and 4. Armature 110 comprises a unitary ferromagnetic cylinder that is guided within a surrounding thin-walled, non-magnetic, cylindrical sleeve 112 that extends between the hubs of pole pieces 60 and 62 within the bobbin core throughhole. The upper end of sleeve 112 contains a flange 113 that is captured between cap 16 and pole piece 60 to secure the sleeve in place. Armature 110 has opposite axial end surfaces that are perpendicular to axis AX. A respective walled circular hole 114, 116 extends from a respective end surface into the armature coaxial with axis AX. Within the armature, the inner ends of these holes 114, 116 are separated by a transverse wall 118 of the armature. A series of circular holes 120 that are centered at 120° intervals about the armature axis extend through wall 118 between the two holes 114, 116.

Stem segment 36 comprises a free distal end portion containing a zone having a series of circumferentially extending serrations, or barbs, 121. A locator member 122 is disposed on and secured to this free distal end portion of stem segment 36. Locator member 122 comprises a cylindrical side wall 124 having a hemispherical dome 126 at one axial end and a rimed flange 128 at the other. The locator member is secured to the valve stem by locally deforming side wall 124 onto barbs 121. Dome 126 is disposed within hole 116 to bear against wall 118. Rimmed flange 128 is external to hole 116 to provide a seat for one axial end of a helical coil spring 130 that is disposed about stem section 36. The opposite end of spring 130 seats on a surface of an end wall 132 of hub 62*a.*

Figure 5:
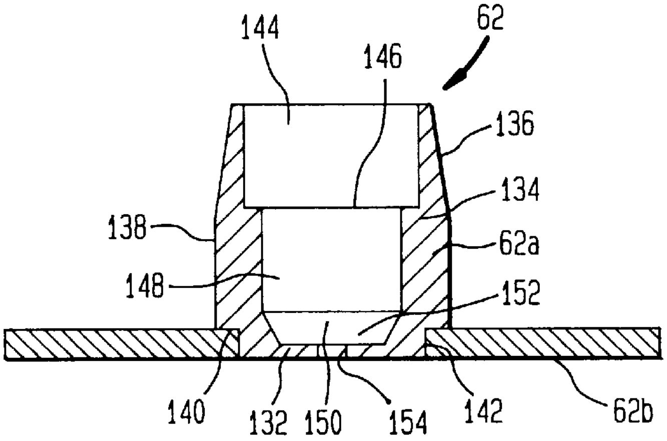
FIG. 5 is an enlarged cross-sectional view of another of the parts of the EEGR valve shown by itself on a slightly enlarged scale, namely a lower pole piece.

Lower pole piece hub 62*a*, shown by itself in FIG. 5, comprises a machined part that comprises an axially extending side wall 134 in addition to end wall 132. Side wall 134 has a radially outer surface (see FIG. 5) profiled to comprise in succession from one end to the other, a frusto-conical taper 136, a circular cylinder 138, and an axially facing shoulder 140, and a circular cylinder 142 of reduced diameter from that of cylinder 138. Side wall 134 has a radially inner surface profiled to comprise in succession from one end to the other, a circular cylinder 144, an axially facing shoulder 146, a circular cylinder 148 of reduced diameter from that of cylinder 144, a chamfer 150, an axially facing shoulder 152, and a circular cylinder 154 of reduced diameter from that of cylinder 148.

Central hub part 62*a* is symmetric about a central axis that is coincident with axis AX. Its inner and outer profiles are surfaces of revolution. The part has an upper axial end which comprises a tapered section that narrows in the direction away from the lower axial end. This tapered section comprises taper 136, which is non-parallel with the central axis of the hub part, and cylinder 144, which is parallel with the central axis of the hub part. Shoulder 146 adjoins cylinder 144 of the tapered section. Chamfer 150 is axially spaced from shoulder 146 by cylinder 148 and bounds shoulder 152 to cooperate therewith in locating the lower end of spring 130 on the lower pole piece.

Lower pole piece rim 62*b* comprises a stamped metal ring, or annulus, having circular inside and outside diameters and uniform thickness. The inside diameter (I. D.) and thickness are chosen to provide for a flush fit to the lower end of hub 62*a*, with the ring's I. D. fitting closely to surface 142 and the margin that surrounds the I. D. bearing against shoulder 140. The axial portion of the hub part comprising surface 142 thus forms a neck extending from shoulder 140. The axial dimension of the ring is preferably substantially equal to the axial dimension of cylinder 142 to provide the flush fit. The two pieces are secured together at this location preferably by a force-fit of the ring's I. D. to cylinder 154 of the hub, which may be reinforced by staking. When appropriate, the outside diameter (O. D.) of rim part 62*b* can be trued by turning of the joined hub and rim. The rim part is fabricated by punching it out of metal strip stock. By having a two-part, rather than a one-part construction, for the lower pole piece, less scrap is generated than if the pole piece were to be machined from a single rough part. The upper pole piece could also be made like manner from two separate parts.

FIG. 2 shows the closed position of valve 10 wherein spring 130 is pre-loaded, forcing valve head surface 28*a* seated closed against seat surface 24*a*. Accordingly, flow through passage 18 between ports 20 and 22 is blocked. The effect of spring 130 also biases dome 126 of locator member 122 into direct surface-to-surface contact with transverse wall 118 of armature 110. Thus, a single load operative connection is formed between armature 110 and locator member 122. The nature of such a connection provides for relative pivotal motion between the two such that force transmitted from one to the other is essentially exclusively axial. The spring bias provided by position sensor 100 also causes sensor shaft 104 to be biased into direct surface-to-surface contact with the surface of wall 118 opposite the surface with which locator member dome 126 is in contact.

As electric current begins to increasingly flow through coil 52, the magnetic circuit exerts increasing force urging armature 110 in the downward direction as viewed in FIG. 2. Once the force is large enough to overcome the bias of the pre-load force of spring 130, armature 110 begins to move downward, similarly moving valve member 26 because of the action of wall 118 on locator member 122. This unseats valve head 28 from seat 24, opening the valve to allow flow through passage 18 between ports 20 and 22. Sensor shaft 104 is maintained in contact with wall 118 to follow the motion. The extent to which the valve is allowed to open is controlled by the electric current in coil 52, and by tracking the extent of valve motion, sensor 100 provides a feedback signal representing valve position, and hence the extent of valve opening. The actual control strategy for the valve is determined as part of the overall engine control strategy embodied by the electronic engine control. Through-holes 120 that extend through wall 118 between holes 114 and 116 provide for the equalization of air pressure at opposite axial ends of the armature.

By providing for locator member 122 to be adjustably positionable on the free distal end of stem 36 before the two are joined, valve 10 can be effectively calibrated. The calibration can be performed either to set the position of the armature relative to the pole pieces, e. g. the overlap of the armature with the tapered end of the lower pole piece hub part, or to set the extent to which spring 130 is compressed when the valve is closed, i.e. the spring pre-load. The calibration is performed during the fabrication process before the coil and bobbin assembly 52, 54 and upper pole piece 60 have been assembled. At that time locator member 122 is positioned on the free distal end of the valve stem to its calibrated position. Once the locator member has been axially positioned on the stem to a position that provides calibration, locator member side wall 124 is fixedly joined to the stem by a procedure, such as crimping. Thereafter the remaining components of the solenoid are assembled.

When the valve is closed, the pressure (either positive or negative) of an operative fluid medium at port 22 acts on valve head 28 with a force in one direction; the same pressure simultaneously acts on valve stem segment 34 with a force in an opposite direction. Hence, the cross-sectional area of stem segment 34 and the cross-sectional area circumscribed by the contact of head surface 28*a* with seat surface 24*a* determine the direction and the magnitude of net force acting on valve member 26 due to pressure at port 22 when the valve is closed. Accordingly, there are various alternative arrangements, each of which can be employed in the valve assembly of the present invention.

First, making the cross-sectional area of stem segment 34 less than the cross-sectional area circumscribed by the contact of head surface 28*a* with seat surface 24*a* provides an embodiment of valve wherein the net force will occur in the direction of valve opening when the pressure is positive, and in the direction of valve closing when the pressure is negative.

Second, making these cross-sectional areas substantially equal provides another embodiment that is substantially fully force-balanced, meaning substantially insensitive to the pressure at port 22. In other words, by making the cross-sectional area that is circumscribed by the contact of valve head surface 28*a* with seat surface 24*a* substantially equal to the cross-sectional area of stem segment 34, as in commonly assigned U.S. Pat. No. 5,413,082, issued May 9, 1995, a full force-balancing effect is attained, making the valve substantially insensitive to varying induction system pressure, either positive or negative.

Third, making the cross-sectional area of stem segment 34 greater than the cross-sectional area circumscribed by the contact of head surface 28*a* with seat surface 24*a* provides still another embodiment wherein the net force will occur in the direction of valve closing when the pressure is positive, and in the direction of valve opening when the pressure is negative.

Once head 28 has unseated from seat 24 in any of these embodiments, valve member 26 may still be affected by pressures acting on head 28 and on stem segment 34, but the net effect may vary depending on several factors. One factor is the extent to which the valve is open. Another is whether the valve is constructed such that the valve head moves increasingly away from both the seat and the outlet port as it increasingly opens (as in the illustrated valve of FIG. 2) or whether the valve head moves increasingly away from the valve seat, but toward the outlet port, as it increasingly opens.

In the illustrated embodiment of FIG. 2, the area defined by the diameter across head surface 28*a* at its contact with seat surface 24*a* is somewhat larger than the cross-sectional area defined by the diameter of stem segment 34 in accordance with the first alternative described above. For example, that diameter of head surface 28*a* may be 10 mm., and that of stem segment 34, 8 mm. For negative pressures at port 22, this differential will yield a net force that acts in the direction of valve closing. This attribute may be beneficial in controlling the valve upon opening, specifically preventing the valve from opening more than an amount commanded by the electromagnetic actuator than if the difference between the diameters were smaller.

Because of its several features, valve 10 can be made dimensionally compact, yet still achieve compliance with relevant performance requirements. An example of the inventive valve which illustrates its beneficial compactness comprises an overall dimension (reference 200 in FIG. 2) of approximately 35 mm. as measured axially from upper pole piece 60 to lower pole piece 62 and a maximum diameter thereacross of approximately 51 mm. This compares with respective correlative dimensions of approximately 40 mm. and approximately 60 mm. for a prior valve having substantially the same flow capacity.

While a presently preferred embodiment of the invention has been illustrated and described, it should be appreciated that principles are applicable to other embodiments that fall within the scope of the following claims.

We claim:

1. An automotive emission control valve comprising a body having an internal main flow passage between a first port and a second port, a valve seat circumscribing a transverse cross-sectional area of the passage, a valve member with a stem and a head that seats on and unseats from the valve seat, an actuator that operates the valve member, the actuator providing a magnetic circuit path that comprises respective pole pieces at respective opposite axial ends of the actuator, at least one of the pole pieces being a two-part pole piece including a central hub part joined to an outer rim part that is disposed circumferentially about the central hub part.

2. An automotive emission control valve as set forth in claim 1 in which the central hub part comprises machined metal and the rim part comprises punched metal strip stock.

3. An automotive emission control valve as set forth in claim 2 in which the central hub part has opposite axial ends one of which comprises a transverse shoulder from which a neck axially extends, and in which the rim part comprises a central opening fitted onto the hub part neck and against the hub part shoulder.

4. An automotive emission control valve as set forth in claim 3 in which the central opening of the rim part comprises a circular hole that fits onto the hub part neck, and in which the axial dimension of the hub part neck and the axial dimension of the rim part hole are substantially equal.

5. An automotive emission control valve as set forth in claim 4 in which the hub part and the rim part are joined both by a force-fit and by a stake.

6. An automotive emission control valve as set forth in claim 3 in which the other axial end of the hub part comprises a taper that narrows in the direction away from the one axial end of the hub part, the taper comprises a radially outer surface of revolution that is non-parallel with a central axis of the hub part, and a radially inner surface of revolution that is parallel with the central axis of the hub part, and in which the hub part comprises an axially facing shoulder adjoining the radially inner surface of the taper.

7. An automotive emission control valve as set forth in claim 2 in which the central hub part has opposite axial ends one of which comprises a taper that narrows in the direction away from the other axial end of the hub part, and in which the taper comprises a radially outer surface of revolution that is non-parallel with a central axis of the hub part and a radially inner surface of revolution that is parallel with the central axis of the hub part.

8. An automotive emission control valve as set forth in claim 7 in which the hub part comprises an axially facing shoulder adjoining the radially inner surface of the taper, the other axial end of the hub part comprises a transverse shoulder from which a neck axially extends, and in which the rim part comprises a central opening fitting onto the hub part neck and against the hub part shoulder.

9. An automotive emission control valve as set forth in claim 1 in which the central hub part is symmetric about a central axis.

10. An automotive emission control valve as set forth in claim 9 in which the central hub part has opposite axial ends one of which comprises a taper that narrows in the direction away from the other axial end of the hub part, the taper comprises a radially outer surface of revolution that is non-parallel with a central axis of the hub part and a radially inner surface of revolution that is parallel with the central axis of the hub part, and in which the hub part comprises an axially facing shoulder adjoining the radially inner surface of the taper.

11. An automotive emission control valve as set forth in claim 10 in which the other axial end of the hub part comprises an axially facing shoulder from which a neck axially extends, and in which the rim part comprises a central opening fitting onto the hub part neck and against the hub part shoulder.

12. An automotive emission control valve as set forth in claim 9 in which the central hub part has opposite axial ends one of which comprises an axially facing shoulder from which a neck axially extends, and in which the rim part comprises a central opening fitting onto the hub part neck and against the hub part shoulder.

13. An automotive emission control valve as set forth in claim 12 in which the hub part and the rim part are joined both by a force-fit and by a stake.

14. An automotive emission control valve as set forth in claim 9 in which the rim part comprises a circular ring symmetric about the central axis.

15. An automotive emission control valve as set forth in claim 1 in which the central hub part comprises a central through-hole, and the stem passes through the central through-hole in the central hub part.

16. An automotive emission control valve as set forth in claim 15 in which the stem terminates in a free distal end, and further including a locator that is joined to the free distal end and engages the armatureat the single operative load connection.

17. An automotive emission control valve as set forth in claim 15 in which the central through-hole in the central hub part comprises an axially facing shoulder and an adjoining chamfer, and further including a spring seated on the axially facing shoulder of the central through-hole in the central hub part and located by the chamfer.

18. An automotive emission control valve as set forth in claim 1 including an exhaust gas recirculation system of an engine in which the valve is connected to control the recirculation of engine exhaust gas to an engine induction system.

19. A pole piece for a magnetic circuit path of an electromagnetic actuator of an automotive emission control valve comprising a central hub part and an outer rim part that is disposed circumferentially about and joined to the central hub part.

20. A pole piece as set forth in claim 19 in which the central hub part comprises machined metal and the rim part comprises punched metal strip stock.

21. A pole piece as set forth in claim 20 in which the central hub part has opposite axial ends one of which comprises a transverse shoulder from which a neck axially extends, and in which the rim part comprises a central opening fitting onto the hub part neck and against the hub part shoulder.

22. A pole piece as set forth in claim 21 in which the central opening of the rim part comprises a circular hole that fits onto the hub part neck, and in which the axial dimension of the hub part neck and the axial dimension of the rim part hole are substantially equal.

23. A pole piece as set forth in claim 22 in which the hub part and the rim part are joined both by a force-fit and by a stake.

24. A pole piece as set forth in claim 23 in which the other axial end of the hub part comprises a taper that narrows in the direction away from the one axial end of the hub part, the taper comprises a radially outer surface of revolution that is non-parallel with a central axis of the hub part and a radially inner surface of revolution that is parallel with the central axis of the hub part, and in which the hub part comprises an axially facing shoulder adjoining the radially inner surface of the taper.

25. A pole piece as set forth in claim 20 in which the central hub part has opposite axial ends one of which comprises a taper that narrows in the direction away from the other axial end of the hub part.

26. A pole piece as set forth in claim 25 in which the taper comprises a radially outer surface of revolution that is non-parallel with a central axis of the hub part and a radially inner surface of revolution that is parallel with the central axis of the hub part.

27. A pole piece as set forth in claim 26 in which the hub part comprises an axially facing shoulder adjoining the radially inner surface of the taper.

28. A pole piece as set forth in claim 27 in which the other axial end of the hub part comprises a transverse shoulder from which a neck axially extends, and in which the rim part comprises a central opening fitting onto the hub part neck and against the hub part shoulder.

29. A pole piece as set forth in claim 28 in which the central opening of the rim part comprises a circular hole that fits onto the hub part neck, and in which the axial dimension of the hub part neck and the axial dimension of the rim part hole are substantially equal.

30. A pole piece as set forth in claim 19 in which the central hub part is symmetric about a central axis.

31. A pole piece as set forth in claim 30 in which the central hub part has opposite axial ends one of which comprises a taper that narrows in the direction away from the other axial end of the hub part.

32. A pole piece as set forth in claim 31 in which the taper comprises a radially outer surface of revolution that is non-parallel with a central axis of the hub part and a radially inner surface of revolution that is parallel with the central axis of the hub part.

33. A pole piece as set forth in claim 32 in which the hub part comprises an axially facing shoulder adjoining the radially inner surface of the taper.

34. A pole piece as set forth in claim 33 in which the other axial end of the hub part comprises an axially facing shoulder from which a neck axially extends, and in which the rim part comprises a central opening fitting onto the hub part neck and against the hub part shoulder.

35. A pole piece as set forth in claim 30 in which the central hub part has opposite axial ends one of which comprises an axially facing shoulder from which a neck axially extends, the rim part comprises a central opening fitting onto the hub part neck and against the hub part shoulder, and in which the central opening of the rim part comprises a circular hole that fits onto the hub part neck, and in which the axial dimension of the hub part neck and the axial dimension of the rim part hole are substantially equal.

36. A pole piece as set forth in claim 35 in which the hub part and the rim part are joined both by a force-fit and by a stake.

37. A pole piece as set forth in claim 30 in which the rim part comprises a circular ring symmetric about the central axis.

38. A pole piece as set forth in claim 19 in which the central hub part comprises a central through-hole comprising an axially facing shoulder and an adjoining chamfer.

39. A method of making a pole piece of an electromagnetic actuator of an automotive emission control valve comprising:

machining both a radially inner, axially extending profile and a radially outer, axially extending profile in a metal part to create a central hub;

punching a metal strip stock to create an outer rim part; and joining the outer rim part to the central hub part.

40. A method as set forth in claim 39 in which the joining step comprises both force-fitting and staking the rim part and the central hub part to each other.

41. A method as set forth in claim 39 including the further step of turning the joined parts to create a radially outer, axial profile for the rim part.

* * * * *